Nov. 13, 1962

D. GABOR 3,064,087

MAGNETIC RECORDING DEVICES

Filed Aug. 19, 1957

INVENTOR
DENNIS GABOR

BY

Brumbaugh, Free, Graves & Donohue

HIS ATTORNEYS

United States Patent Office 3,064,087

Patented Nov. 13, 1962

3,064,087

MAGNETIC RECORDING DEVICES

Dennis Gabor, London, England, assignor to Minnesota Mining & Manufacturing Company, St. Paul, Minn., a corporation of Delaware

Filed Aug. 19, 1957, Ser. No. 678,888

7 Claims. (Cl. 179—100.2)

The present invention relates to magnetic recording heads for recording intelligence in a magnetic record medium such as a magnetic tape, for example. More specifically, it has to do with magnetic recording apparatus of this general character which is capable of recording the higher frequency signals to a greater depth in the record medium than has been possible heretofore.

In the majority of magnetic recorders currently in use, a tape carrying a coating of finely divided magnetic material is transported past a narrow gap defined by closely-spaced opposed pole pieces in a magnetic circuit linking a winding. The winding is adapted to be energized by signal current and superimposed high frequency bias to produce an intense magnetic field in a narrow region close to the gap. While such apparatus is effective, it suffers from the serious fundamental physical limitation that the signal amplitude recorded in the magnetic coating at a depth $d$ below the surface thereof is smaller than the signal amplitude recorded at the surface by a factor exp $(-2\pi d/\lambda)$ where $\lambda$ is the wavelength of a sinusoidal signal recorded longitudinally on the surface of the tape. For instance, at a depth $d$ equal to $\lambda/4$ in the magnetic coating, the amplitude drops to exp $(-\frac{1}{2}\pi)=0.208$ of the surface value.

Expressed in another way, regardless of the thickness of the magnetic coating, the total recorded signal amplitude will not be greater than if it had been recorded uniformly in a layer of thickness $\lambda/2\pi$. For example, at a tape speed of 7.5″/sec., the wavelength at ten kilocycles per second is 0.75 mil, and the thickness of the equivalent is 0.12 mil, which is rather less than the usual thickness of the coating on the magnetic tapes commonly employed. At a tape speed of 1⅞″ and at the same frequency, the equivalent layer thickness is only 0.03 mil or 0.75 micron. In this case, not only is a tape having a coating of the usual thickness inefficiently used, but the magnetized surface layer is of such minute thickness that it would be easily rubbed off in repeated playing of the tape.

A further disadvantage of the conventional tape recording head is that it subjects the tape to a strong transverse magnetic field as the tape passes out under the exit edge of the gap. This transverse magnetic field is not only useless, since it does not contribute to the signal generated in the playback head, but it may be harmful because it tends to reorient the magnetic domains of the tape which have been longitudinally magnetized in the central part of the gap field, and thereby at least partly destroys the signal.

It is an object of the invention to provide new and improved magnetic recording apparatus which is free from the above-noted disadvantages and deficiencies of the prior art.

Another object of the invention is to provide new and improved magnetic recording apparatus of the above character which is capable of recording signals of shorter wavelengths to a depth much greater than is possible with conventional recorders.

According to the invention, these and other objects are achieved by applying magnetomotive forces to both sides of the record medium. One magnetomotive force is applied to the surface of the magnetic coating by a recording head of conventional type. The other is of such character that, although it emanates from a source that is separated from the inner surface of the coating by at least the thickness of the base on which the coating is supported, it produces a magnetizing field that does not spread out, but is confined to a narrow region, as if it had been produced by a conventional head located inside the tape, at the inner surface of the magnetic coating.

In a typical embodiment, magnetomotive force for magnetizing the coating through the base is developed by at least two very narrow current loops forming, as a whole, a completely balanced current system. The current in each loop is a suitable multiple of the current in a conventional recording head which simultaneously acts on the magentic tape at the outer surface of the coating. The current ratio is so adjusted that the longitudinal magnetic field intensity is substantially constant in the magnetic coating and is substantially independent of the depth below the surface of the coating. Moreover, the useless or harmful transverse magnetization is reduced to a minimum, being zero at the depth where the longitudinal intensity is a minimum, and less concentrated at depths above and below the depth where minimum longitudinal intensity obtains.

The invention may be better understood from the following detailed description of several representative embodiments, taken in conjunction with the accompanying drawings in which.

Figure 1:
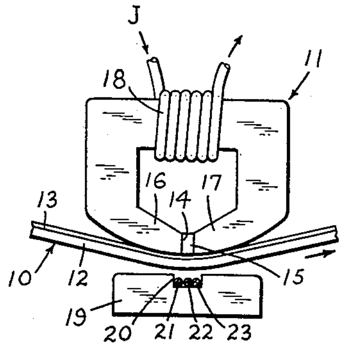
FIG. 1 is a side view in elevation of magnetic recording apparatus according to the invention.

In FIG. 1 a magnetic tape 10 is shown being transported through the recording head 11. The tape 10 is of conventional type comprising a base 12 having a magnetic coating 13 engaging the recording head 11. The magnetizing field is produced in a narrow gap 14, occupied by a nonmagnetic spacer 15, between two opposed pole pieces 16 and 17 in a magnetic circuit linking a winding 18 which receives a current J including signal current and the usual supersonic bias current.

Below the tape 10 is a laminated body 19 of magnetic material having a slot 20 formed therein extending transversely of the tape 10. In the slot 20 are three fine wires 21, 22 and 23, preferably of silver, which may be so-called Wollaston wires of the order of 0.6 mil in diameter. The wires 21, 22 and 23 are secured together at one end 24 and to a cooling fin 25, preferably by brazing with hard solder under a microscope with a capillary flame. At their other ends, the wires 21 and 23 are both soldered to a larger wire 26 and the wire 22 is similarly soldered to a larger wire 27. The wires 21, 22 and 23 should, of course, be insulated, but only with a very thin layer of insulation.

One way of insulating the conductors 21, 22 and 23 is to coat them by electrophoresis with a very thin layer of finely ground glass powder, and to melt the layer of glass powder to form a thin enamel. Another way is to expose the conductors to iodine vapor or to wet chlorine gas.

A recommended method for fixing the conductors 21, 22 and 23 in the slot 20 is by means of molten silver chloride. This material forms on solidification a horny, slightly plastic substance which is well suited to hold the conductors even under conditions of differential expansion resulting from differential heating. At the same time, the silver chloride provides a good heat contact with the laminated body 19.

Figure 4B:
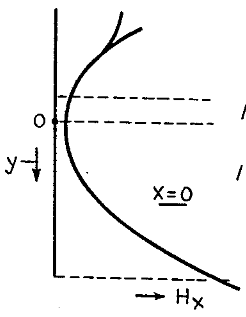
FIGS. 4A, 4B and 4C are graphs illustrating the distribution of the magnetic field intensity in three essential planes.
Figure 4A:
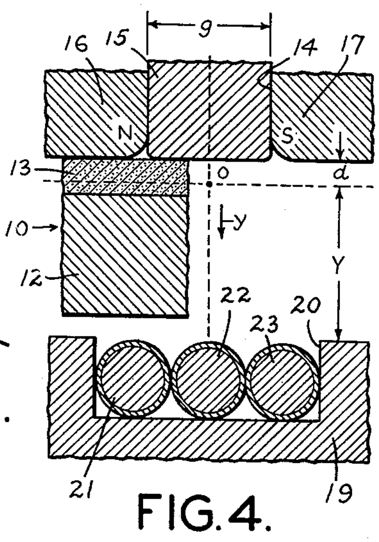
Figure 4:
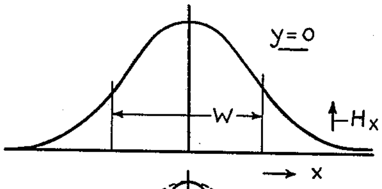
FIG. 4 is an enlarged view of the portion of the recording apparatus of FIG. 1 which establishes the recording magnetic field in the tape.

Part of the recording head of FIG. 1 is shown in FIG. 4 on a much enlarged scale as an aid in understanding the following mathematical analysis. In what follows, $g$ is the width of the spacer 15; $d$ is the depth below the surface of the tape coating 13 where pure longitudinal magnetization is desired; and the center point $o$ in the symmetry plane of the device is taken as the origin of the coordinate system with $x$ and $y$ the longitudinal and transverse coordinates, respectively, both measured from $o$.

According to the invention, the recording head is designed to produce a field distribution that approximates the ideal which may be expressed as follows:

$$Hx = Ho \exp (\pi(y^2 - x^2)/w^2) \cos 2\pi xy/w^2 \quad (1)$$

$$Hy = Ho \exp (\pi(y^2 - x^2)/w^2) \sin 2\pi xy/w^2 \quad (2)$$

where H$x$ and H$y$ are the longitudinal and transverse components, respectively, of the magnetic field intensity. That Equations 1 and 2 are in fact exact solutions of the field equations will be readily appreciated by considering that $$Hx + jHy = Ho \exp (-\pi(x+jy)^2/w^2) \quad (3)$$

is a function of the complex coordinate $x+jy$.

At the level $y=o$, which is at a small distance $d$ from the pole pieces 16 and 17, it is desired that the field be exactly longitudinal, i.e., $$Hx = Ho \exp (-\pi x^2/w^2) \quad (4)$$

$$Hy = o \quad (5)$$

A graph of this function is shown in FIG. 4B. It can be considered as a nearly ideal field distribution for recording.

In order to realize the field distribution defined by Equations 1 and 2 above, it is necessary and sufficient that it be realized at two different values of $y$, e.g., at $y=-d$ (at the level of the upper pole faces), and at $y=Y$, at the surface of the laminated body 19. The distribution of $Hx$ at $Y=-d$ differs so little from that given by Equation 4 above that it can be taken as represented by FIG. 4B. It can be very nearly realized by a gap $g$ as shown, somewhat smaller than $w$, with the pole pieces 16 and 17 slightly rounded as shown in FIG. 4.

Considering now the field distribution at the level $y=Y=w$, $$Hx = Hoe^{\pi} \exp (-\pi x^2/w^2) \cos 2\pi x/w \quad (6)$$

$$Hy = Hoe^{\pi} \exp (-\pi x^2/w^2) \sin 2\pi x/w \quad (7)$$

Figure 4C:
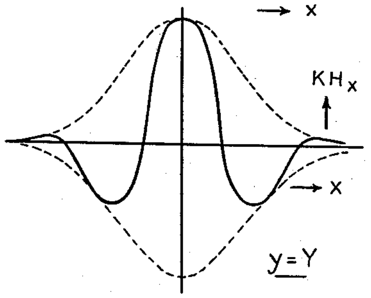

A graph of the function expressed in Equation 6 is plotted in FIG. 4C, the scale in this figure being $\frac{1}{23}$ the scale in FIG. 4B. It will be observed that the graph exhibits three peaks, a central positive peak, and two negative peaks symmetrically disposed about the central peak and of one-half the intensity of the latter.

The field distribution plotted in FIG. 4C is closely approximated by the three conductors 21, 22 and 23 in FIG. 4 when the central conductor 22 is carrying a current I of suitable value and the currents flowing through the side conductors 21 and 23 are both $-\frac{1}{2}$ I. The value of I must be such that the longitudinal magnetic field intensity in the center ($x=o$) of the plane $y=Y$ is $Ho \exp (\pi) = 23Ho$. In other words, the conductor 22 should be energized by current having the same wave form but twenty-three times the amplitude of the current fed to the winding 18 (FIG. 1) and the same current at half the amplitude should flow through each of the conductors 21 and 23.

FIG. 4A is a graph illustrating how the component H$x$ of the field distribution varies in the central plane $x=o$. It will be noted that the intensity of H$x$ rises very steeply in going from $y=o$ to $y=Y$. For example, whereas $Hx/Ho$ has a value of twenty-three for $y=w$, for $Y=2w$ it would have a value of about 250,000. It is not practicable, therefore, to make the characteristic field width $w$ much smaller than the thickness of the tape. On the contrary, if it were made somewhat larger, the current intensity requirements would be less. As a practical matter, the graph of FIG. 4C is so easily and closely realized that the three conductor system of the invention is preferred, in spite of the somewhat high current requirements.

In a practical device, the tape base 12 may be 1 mil in thickness, the coating 13 0.2 mil thick for a total tape thickness of 1.2 mils; $d$ is about one-half the thickness of the tape coating or 0.1 mil; $Y=w=1.5$ mils so that the tape has a safe clearance of 0.4 mil; the spacing between the axes of the conductors 21, 22 and 23 is 0.75 mil, and allowing for insulation, their bare radius R may be 0.33 mil or eight microns; and the total width of the slot 20 is about 2.3 mil, although this is not critical.

Assuming that the laminated body 19 is of good permeability, the longitudinal component of the magnetic field distribution at $x=o$, $y=Y$ can be shown to be approximately 0.21 $I/R$. This must be 23 times H$o$, the maximum field intensity at $y=o$. For medium coercive tapes of the type commonly used, H$o$ may have a maximum value of 100 oersteds so that the maximum field intensity at the level $y=Y$ may have to be as much as 2500 oersteds. For $R=8$ micron$=0.0008$ cm., a current value of almost 10 amperes is required to achieve this field intensity. Though this appears excessive for silver wires of only 16 microns diameter, it is entirely feasible in the present device because the conductors 21, 22 and 23 are short and are in good heat conducting relation to the body 19.

The maximum heat is generated in the central conductor 22 which carries the maximum current of about 10 amperes. The conductor 22, however, need not be longer than .080″=0.2 cm. so that its resistance, assuming it is silver at 100° C., is about 0.2 ohm, for which the heat dissipation would be 20 watts. The distance from the center of the conductor to either end is only 0.1 cm. so that a temperature drop of 100° C. is sufficient to transport 10 watts to either end. It is, therefore, sufficient to cool the ends of the conductor well, as by blast of air, to insure that the temperature of the conductors 21, 22 and 23 does not rise by more than 100° C. Of course, some heat will flow off directly to the metal body 19. Also, a mitigating factor is that the peak current of 10 amperes will occur only occasionally.

Figure 2:
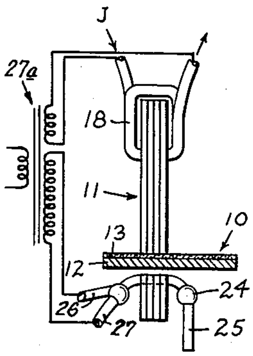
FIG. 2 is an end view of the apparatus shown in FIG. 1.
Figure 3:
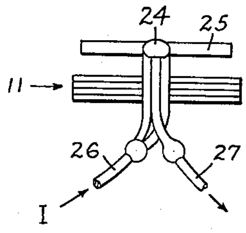
FIG. 3 is a plan view of the portion of the recording apparatus which lies beneath the record medium in FIG. 1.

It will be observed that the magnetic intensity H$o$, which has been assumed to be 100 oersted peak, is contributed half and half by the magnetizing elements that are located above and below the tape, respectively. Hence, I must be of the order of 10 amperes when J, the current supplied to the winding 18, is such that by itself it would produce a magnetic field intensity of 50 oersteds in the center of the magnetic coating. With a gap 14 of the order of 1.5 mils, this requires about 0.16 ampere turns for the winding 18, or 16 milliamperes through ten turns. Therefore, the same input that is fed to the winding 18 should be supplied to the conductors 26 and 27 through a transformer 27a (FIG. 2) having a turn ratio of about 6000:1. The peak power supplied by the amplifier (not shown) should be of the order of 30 watts, including also the customary supersonic bias generator. However, it is only rarely that the peak power will be required and the mean power is not likely to exceed five watts.

The assembly and adjustment of recording devices, according to the invention, must be effected with great accuracy. However, this is not difficult to achieve if the schedule outlined below is followed. First, the body 19 is adjusted relative to the part of the device above the tape 10 until the planes of symmetry of the two accurately coincide. This is done preferably by moving the body 19 relatively to the part above the tape until maximum emf is induced in the winding 18 by the conductors 21, 22 and 23. Next, the ratio of the currents I and J is adjusted for optimum results. This is done by recording a high frequency signal, near the cut-off of the upper head, and playing it back for different values of I (J being kept constant) until the response is a maximum. Finally, the amplitude of the supersonic bias is adjusted to its optimum value, as usual.

The power requirements can be reduced by the simple expedient of making the gap 14 (FIG. 1) appreciably smaller than the thickness of the tape. This short circuits a part of the flux path, reducing not only the ampere turns required for the winding 18, but also the current required in the conductors 21, 22 and 23. While for ease of explanation, the gap 14 in FIG. 1 has been assumed to be only slightly smaller than $w$ or Y (FIG. 4), the best mode of operating the device according to the invention is with appreciably smaller gap widths.

Because the penetration of the magnetic field at the air gap of conventional recording equipment is so shallow it has heretofore been possible to record two different information records on magnetic layers coated on opposite sides of the same tape base. Consequently, tapes of this type are commercially available and it is possible to utilize the present invention to record on one side of such a tape, while preserving the opposite side for use with conventional recording equipment.

Figure 5:
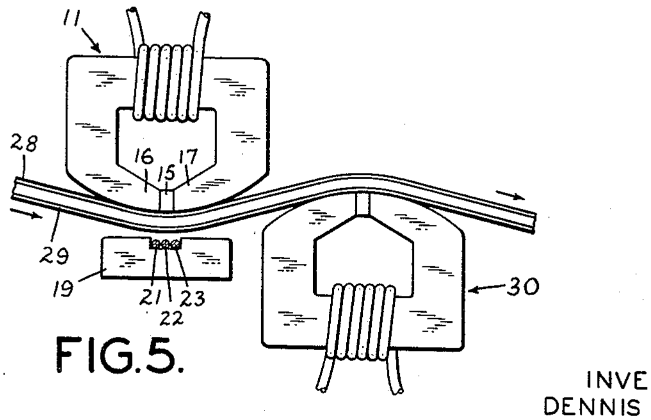
FIG. 5 is a side view of a modification that is adapted for recording on double-sided magnetic tape in which the unwanted signal is erased after a desired signal has been recorded.

FIG. 5 illustrates a modification which is useful for recording on tape having magnetic coatings 28 and 29 on both sides of the base 12. It will be understood that the recording device, which is the same as that shown in FIG. 1, will record an unwanted track in the lower coating 29. This record is erased by a conventional eraser device 30, which, because of the shallow penetration of its field, will not affect the record made in the upper coating 28.

From the foregoing, it will be understood that the invention provides novel and highly effective magnetic tape recording apparatus which is capable of recording the higher frequencies to a much greater depth than has been possible heretofore. As a result, the apparatus is capable of recording perhaps double the frequency range at a given speed, or it may enable a given frequency range to be recorded at half the speed now required with the devices of the prior art. Also, contact between the tape and the pole pieces 16 and 17 (FIG. 1) is not necessary in the apparatus of the invention. On the contrary, a shim or spacer could be introduced between the tape and the pole pieces so as to reduce wear, at the same time reducing the current I and increasing the current J to maintain the level at which $Hy=o$ about in the middle of the magnetic coating. This would also result in savings of current and power.

The several specific embodiments described above are intended to be merely illustrative, and the invention is not to be limited thereto but comprehends all modifications falling within the scope of the claims appended hereto.

I claim:

1. In apparatus for recording magnetically on a medium, the combination of magnetic circuit means linking first winding means responsive to a signal to be recorded and having a narrow air gap extending to the location of the medium, a magnetically permeable core member on the opposite side of the location of the medium from the air gap closely adjacent thereto and formed with a shallow recess facing the air gap and second winding means also responsive to the signal to be recorded including a plurality of electrical conductors supported in the shallow recess in the core member closely adjacent to the air gap, so that the magnetic field adjacent to the conductors of the second winding means directly influences the magnetic field distribution established by the magnetic circuit means in the vicinity of the air gap.

2. Apparatus according to claim 1 wherein the electrical conductors of the second winding means extend parallel to and are disposed symmetrically about the plane of the air gap.

3. In apparatus for recording magnetically on a medium, the combination of a first magnetic circuit linking first winding means and having a narrow air gap and second magnetic circuit means comprising a magnetically permeable core spaced from said air gap, second winding means carried by said core and having two bifilar current loops including a common conductive path, said loops being disposed symmetrically about the plane of symmetry of said air gap.

4. In apparatus for recording magnetically on a medium, the combination of a first magnetic circuit linking first winding means and having a narrow air gap, and second magnetic circuit means comprising a magnetically permeable core spaced from said air gap, second winding means carried by said core and having two bifilar current loops including a common conductive path, said loops being disposed symmetrically about the plane of symmetry of said air gap and the spacing between the outer conductive paths provided by said loops being approximately equal to the spacing between said air gap and said permeable core.

5. In apparatus for recording magnetically on a medium, the combination of a first magnetic circuit linking winding means and including spaced pole pieces forming a narrow air gap, a permeable core member spaced from said air gap, three closely spaced, parallel conductor elements carried by said core member connected to form two bifilar loops including a common conductive path through one of said conductor elements, said conductor elements being disposed symmetrically about and substantially perpendicular to a plane of symmetry through said air gap, and the spacing between the outer of said conductor elements being approximately equal to the spacing between said air gap and said core member.

6. Apparatus for recording magnetically on a medium as defined in claim 5 in which said two bifilar loops are connected to the winding means for the first magnetic circuit for energization therewith but at a higher energy level and means is provided for dissipating heat generated in said conductor elements.

7. Magnetic recording apparatus comprising a first magnetic circuit linking winding means responsive to a signal to be recorded and having a narrow air gap, and second magnetic circuit means near said air gap also responsive to the signal to be recorded for modifying the magnetic field distribution established by said first magnetic circuit in the vicinity of said air gap together with erasing means for erasing from the magnetic coating on one side of a recording medium having magnetic coatings on both sides, and which has been subjected to said modified magnetic field distribution, any signal recorded thereon by the second magnetic circuit means.

References Cited in the file of this patent

UNITED STATES PATENTS

| | | |
|---|---|---|
| 2,675,429 | Rohling | Apr. 13, 1954 |
| 2,718,562 | Howell | Sept. 20, 1955 |
| 2,850,581 | Gratian | Sept. 2, 1958 |
| 2,873,319 | Mee | Feb. 10, 1959 |
| 2,885,489 | Barry | May 5, 1959 |
| 2,975,241 | Camras | Mar. 14, 1961 |